United States Patent [19]

Yan et al.

[11] Patent Number: 4,615,013
[45] Date of Patent: Sep. 30, 1986

[54] METHOD AND APPARATUS FOR TEXTURE GENERATION

[75] Inventors: Johnson K. Yan, Milpitas; Nicholas S. Szabo, Cupertino; Lish-Yann Chen, Milpitas, all of Calif.

[73] Assignee: The Singer Company, Binghamton, N.Y.

[21] Appl. No.: 519,602

[22] Filed: Aug. 2, 1983

[51] Int. Cl.[4] .............................................. G09B 9/08
[52] U.S. Cl. ..................................... 364/521; 358/104
[58] Field of Search ....................... 364/518, 521, 522; 358/104; 434/43

[56] References Cited

U.S. PATENT DOCUMENTS

| | | | |
|---|---|---|---|
| 4,208,719 | 6/1980 | Lotz et al. | 364/521 |
| 4,343,037 | 8/1982 | Bolton | 364/521 |
| 4,459,676 | 7/1984 | Oguchi | 364/521 |
| 4,475,104 | 10/1984 | Shen | 364/521 X |
| 4,488,244 | 12/1984 | Freeman | 364/525 |

FOREIGN PATENT DOCUMENTS 2051525 1/1981 United Kingdom .

Primary Examiner—Edward J. Wise
Attorney, Agent, or Firm—Barry L. Haley; Thomas E. Schatzel

[57] ABSTRACT

A method and an apparatus for texture generation for a digital image generator of an aircraft flight simulator is disclosed in which (a selected two of the three) coordinates of each pixel of an image are inverse transformed to earth coordinates (112-124, in FIG. 11) from which addresses are developed (126, 128 and 130) for accessing a texture table (132 and 134) to retrieve elements from which an appropriate pixel intensity is developed (140). The table stores near (132) and far (134) texture, the far texture elements being interpolated to avoid a checkerboard effect, stores a limited number of texture types, the elements of selected texture types being combined (132 and 134) to develop additional texture types, and stores levels of detail (degrees of filtering) the appropriate levels being accessed (126) to avoid aliasing (scintillation of a scene), adjacent levels being mixed (136 and 138) to provide smooth detail level transition.

17 Claims, 28 Drawing Figures

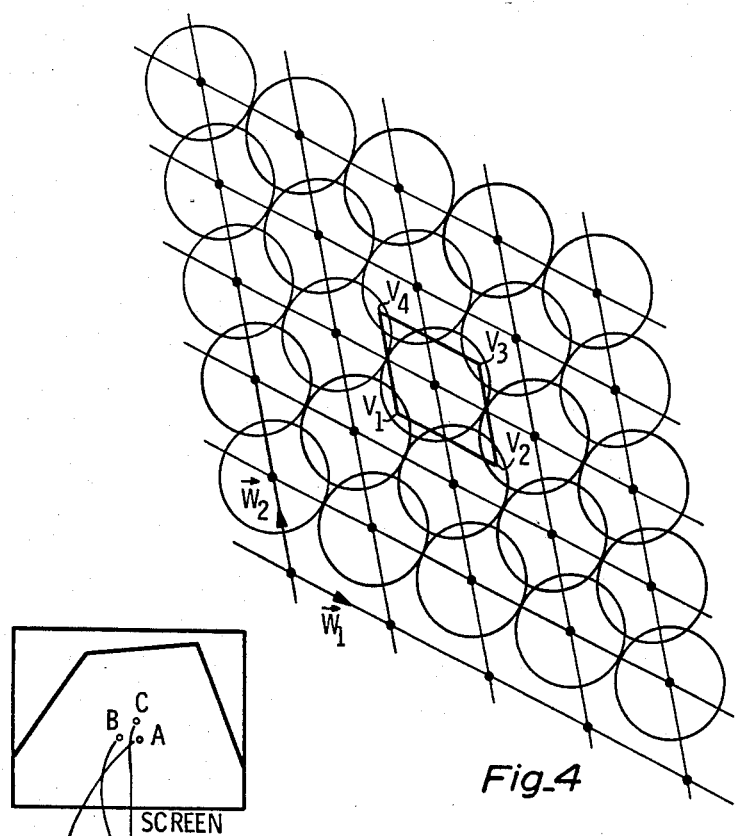
Fig_4
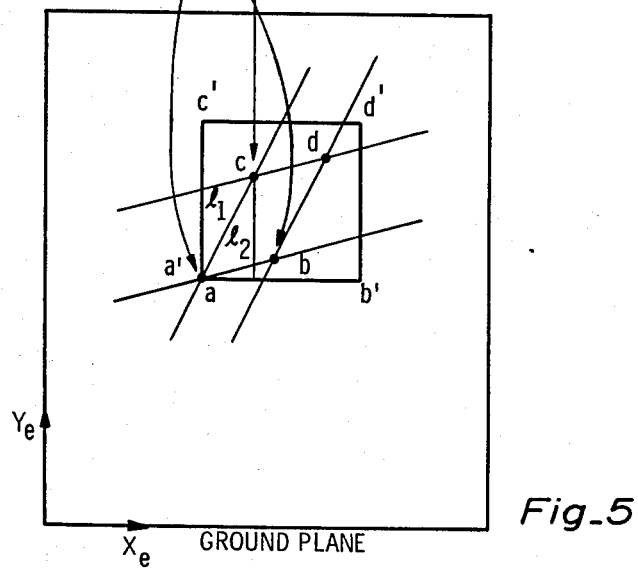
Fig_5

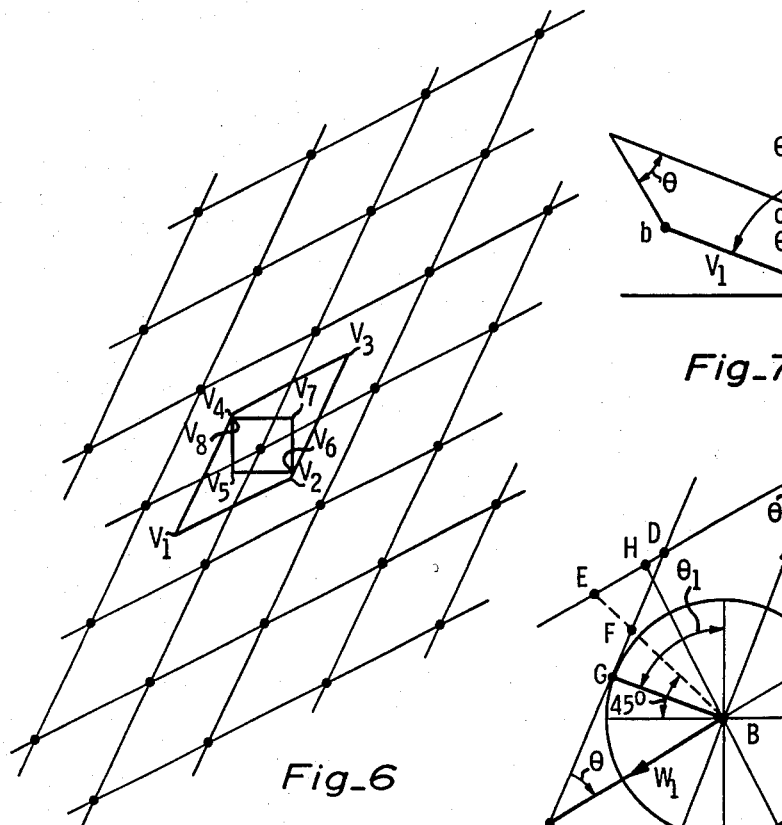
Fig_6
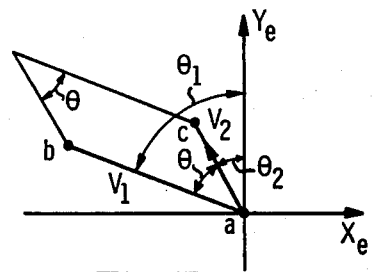
Fig_7
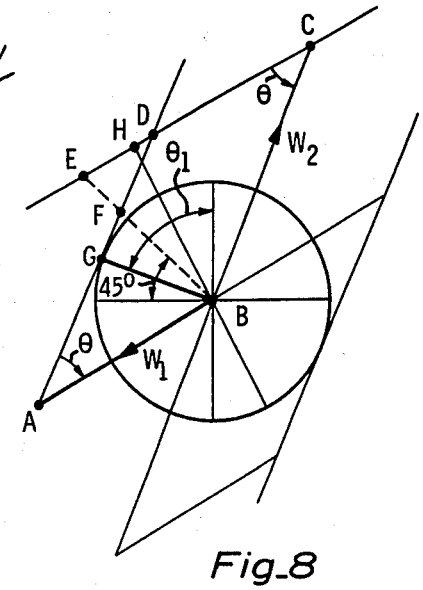
Fig_8
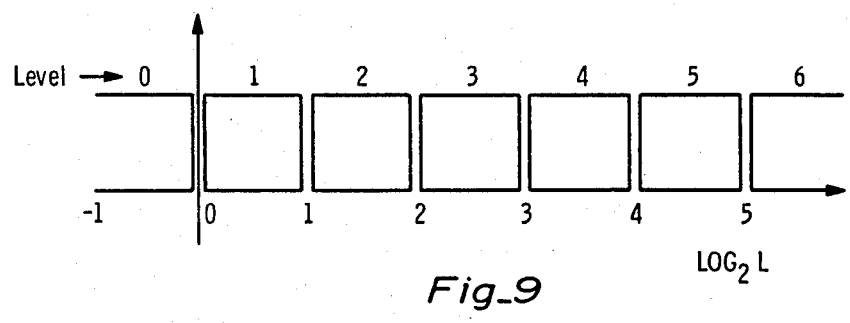
Fig_9

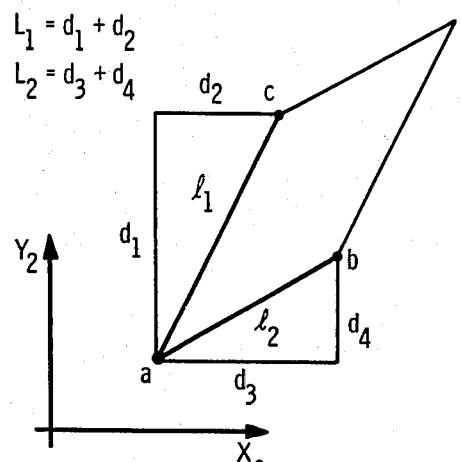
Fig_10
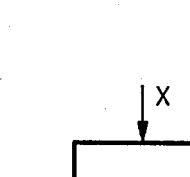
Fig_12

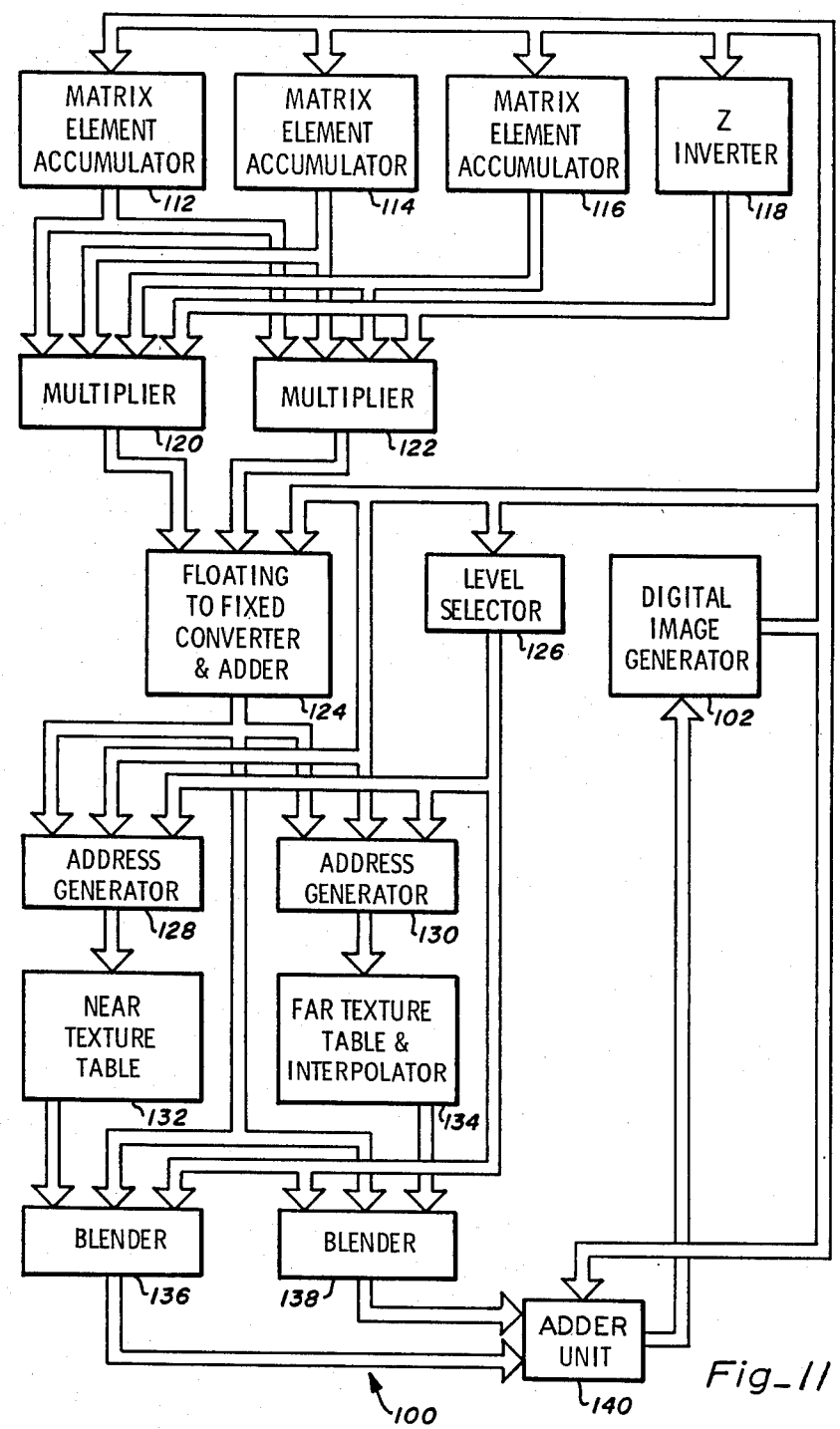
Fig_11

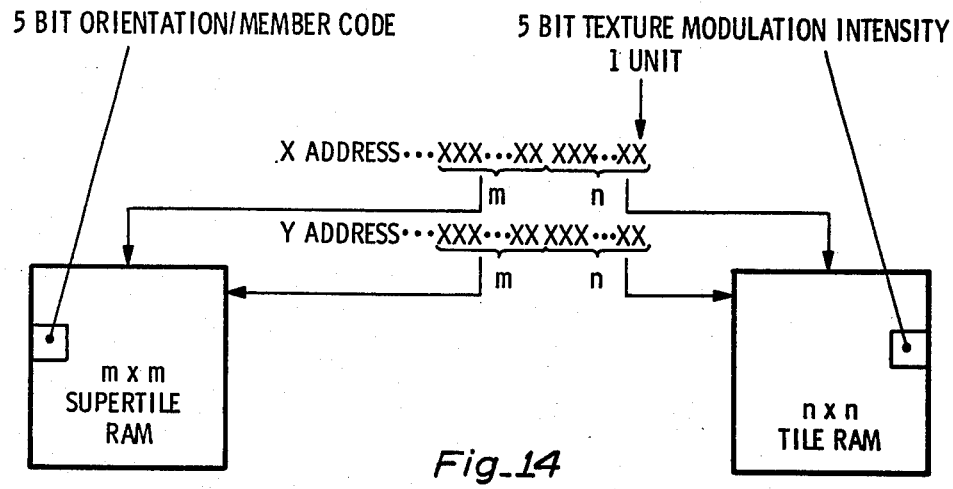
Fig_14
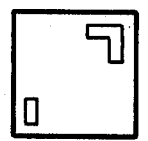 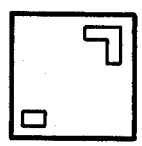 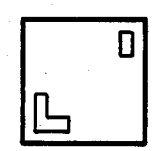 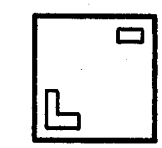
Fig_13A  Fig_13B  Fig_13C  Fig_13D
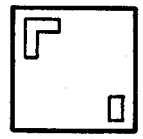 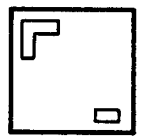 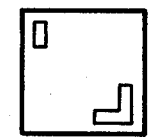 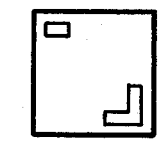
Fig_13E  Fig_13F  Fig_13G  Fig_13H
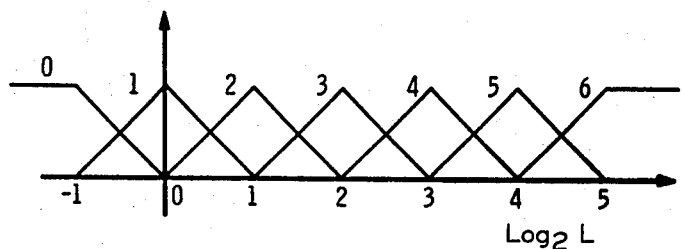
Fig_17

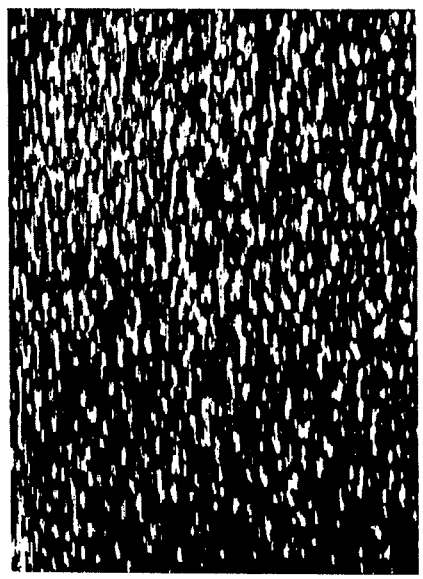
Fig_16
Fig_19
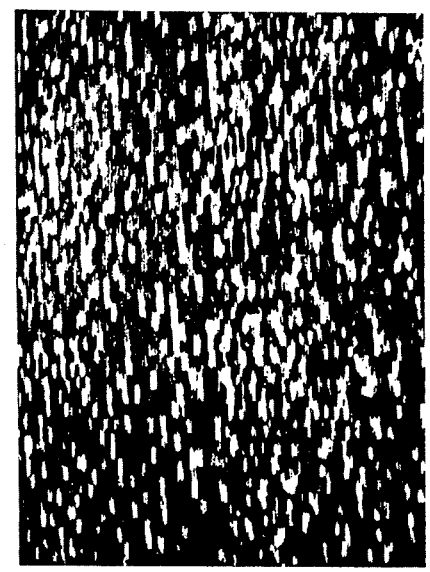
Fig_15
Fig_18

Fig_20

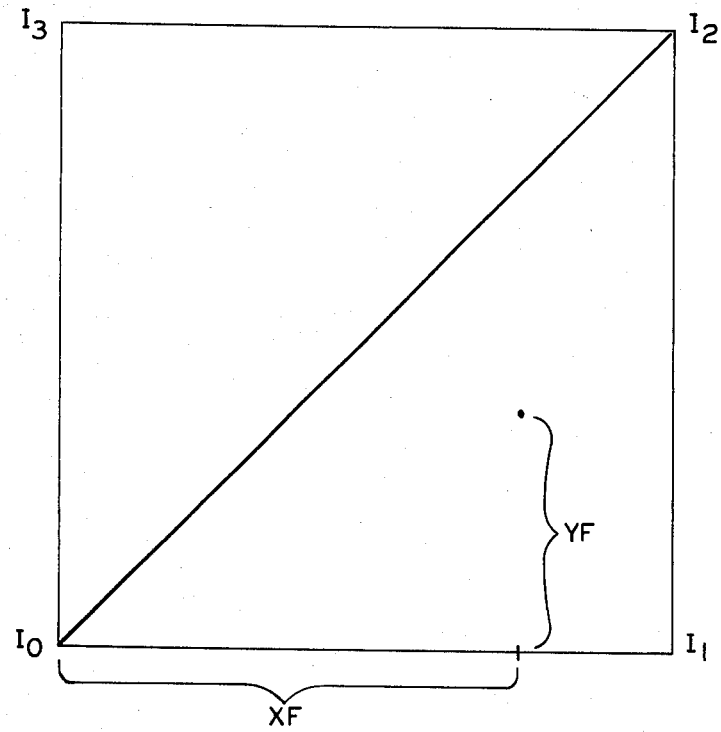
Fig_21

METHOD AND APPARATUS FOR TEXTURE GENERATION

TECHNICAL FIELD

The present invention relates to digital image generation for aircraft flight simulators generally and more specifically to a method and an apparatus for adding texture to such an image.

BACKGROUND ART

Aircraft flight simulators provide an alternative for pilot training to the use of aircraft, the use of which may, at times, be inconvenient, uneconomical and/or dangerous. Obviously, the validity of such training is in direct relation to the degree to which an aircraft flight simulator reflects the respective aircraft including the interior of the cockpit, the response of the controls and, of course, the view from the window.

Simulation of the view from the window of an aircraft is provided by a system which is referred to as a modular digital image generator (DIG). The generator employs a high volume memory (such as is provided by a disk storage unit), a geometric processor which includes a high speed memory (analogous to a computer cashe type memory), a video processor which includes a pair of memories, and a display. Stored in the high volume memory is a data base the element of which define the terrain (including natural formations and cultural structures) of the simulation (gaming) area. More specifically, the terrain is modeled by polygon surfaces (faces). For each polygon surface the data base includes, as elements, the coordinates of the vertices defining the surface, the surface normal vector (both in a reference (earth) coordinate system) and tonal parameters.

From the high volume memory, those elements of the data base which define the terrain within the visibility range of the simulated aircraft location are transferred to the high speed memory to maintain therein an active data base. Acting upon the elements in the high speed memory, the geometric processor transforms each vertex of each surface visible to the pilot from the (three-dimensional) reference (earth) coordinate system to a pilot's eye (Z) coordinate system. Then, by means of perspective division, each transformed vertex is projected onto a (two-dimensional) window (screen) coordinate system. Finally, associated projected vertices are interconnected to define projected polygon surface edges. From each surface normal vector, respective tonal data and the simulated sun position, the geometric processor also calculates shading and fading parameters for each projected surface. With the edges, the shading and fading parameters for each projected surface are transmitted to the video processor.

From the list of edges and shading and fading parameters, the video processor develops intensities for each projected surface, picture element by picture element (pixel), the elements being stored in respective locations of one of the two video processor memories. While one of the video processor memories is being filled, the intensities stored in the other memory are retrieved (double buffered) and transmitted to the display.

The display converts the transmitted intensities into an image. The image is "painted" in a raster format in which a series of picture elements (pixels) forms a line, a series of parallel lines forms an image field and a pair of successive fields forms an image frame, the lines of alternated fields being interlaced.

Unfortunately, the images generated by the above mentioned modular digital image generator lack texture (non-uniformity in color and intensity on surfaces). It has been found that untextured surfaces deprive pilots of important motion and distance cues. While it is possible to add more detail with polygons (edges), it has been found to be impractical being much too hardware expensive.

For additional information regarding the above mentioned modular digital image generator the reader is referred to the U.S. patent application Ser. No. 394,229, filed on July 1, 1982 by Johnson K. Yan and Judit K. Florence.

A digital image generator for generating images having texture is disclosed by M. Bolton in the U.S. Pat. No. 4,343,037. In generating the images, the generator calculates the X and Y earth surface coordinates for the point which corresponds to each pixel (picture element) of the image. Each pair of X and Y coordinates is used as an address to retrieve a pre-stored texture modulation intensity for the pixel from a texture table. To avoid aliasing, the intensities stored in the table have been pre-filtered. To select an intensity having an appropriate level of detail (degree of filtering), the distance between the earth surface points calculated for the current and previous pixels is computed for use with the X and Y coordinates in addressing the table.

Unfortunately, the quality of the images generated by the digital image generator disclosed by M. Bolton is limited by the earth surface coordinate and detail level calculations. Additionally, the quality of the images is limited because the generator does not employ means for adjacent level blending and means for (far) texture intensity interpolation. Finally, the texture of the images generated appears repetitious unless a relatively large texture table is used.

The reader may find of interest the U.S. Pat. Nos. 4,154,766 disclosed by Osofsky, et al., 4,179,824 disclosed by D. Marsh and 4,213,254 disclosed by Sullivan, et al. Disclosed in the later three patents are sytems which paint objects a face at a time by means of a "mini-raster". Each of the systems include means (in the later two patents provided by a "texture" stage) for selecting one of a limited number of mini-raster line densities (resolutions) and beamwidths (focus). The later patent also includes a pattern generator by means of which certain regular polygons may be repeated to conserve memory.

DISCLOSURE OF THE INVENTION

Accordingly, it is a primary object of the present invention to provide a method and an apparatus for generating texture in real time.

Another primary object of the present invention is to provide a method and an apparatus for generating texture which may be superimposed on surfaces (curvilinear and planar) of any orientation and on smooth shaded objects.

Providing a method and apparatus for generating texture patterns which are suggestive of the real world material they are intended to represent, which are continuous across object surface boundaries and which are free of aliasing is another primary object of the present invention.

Another primary object of the present invention is to provide a method and an apparatus for generating texture patterns which exhibit appropriate levels of detail and provide gradual (imperceptible) detail level transitions.

Still another primary object of the present invention is to provide a method and an apparatus for generating texture which is repeatable and coherent from frame to frame and which is in (and remains in) correct perspective and appropriate occultation.

Finally, another primary object of the present invention is to provide a method and apparatus for texture generation which affords a data base modeler the ability to control the kind of texture to be superimposed on a surface and to specify different types of texture to be superimposed on different surfaces.

These and other objects of the present invention are realized by a texture generation method which includes the initial steps of obtaining texture modulation intensities; filtering the intensities to prevent aliasing; and storing the filtered intensities to develop a texture modulation intensity pattern table storing near and far texture each of which have several texture types with each type covering several tiles (areas) and each tile having several levels of detail (degrees of filtering).

Thereafter, during a mission, the method includes the steps of inverse transforming to earth coordinates two of the three coordinates of each pixel (picture element) which is to receive texture of the digital image generated by a digital image generator; calculating a number representing an appropriate level of detail for the pixel; developing an address from a texture code for the pixel, the two earth coordinates and the level number to access the texture modulation intensity pattern table in a selected orientation to retrieve a level N and a level N+1 element for each of a selected one or two texture type for the near texture and three such sets of elements forming a triangle for the far texture; accessing the table to retrieve the elements; combining the corresponding texture type elements; mixing the level N and level N+1 combined elements in the proportion specified by the level number; interpolating the mixed far texture elements based on the address; combining the near texture mixed element and the far texture interpolated element to develop the appropriate texture intensity for the pixel; and combining the texture intensity for the pixel with the intrinsic intensity developed by the digital image generator for the pixel to obtain a suitable intensity for painting the pixel.

These and other objects and advantages of the present invention will no doubt become obvious to those of ordinary skill in the art after having read the following detailed description of the preferred embodiment as illustrated in the various drawing figures.

BRIEF DESCRIPTION OF THE DRAWING

FIG. 4 is a diagram illustrating the frequency spectrum of the intensity pattern shown in FIG. 3 when sampled at the points designated by the sampling lattice shown in FIG. 2;

FIG. 5 is a diagram illustrating an approximation of the sampling lattice;

FIG. 6 is a diagram illustrating the largest inscribing square of the parallelogram passband;

FIGS. 7 and 8 are diagrams representing a sampling lattice in the spatial domain and its corresponding reciprocal lattice in the frequency domain, respectively;

FIG. 9 is a diagram illustrating level selection as a function of $\log_2 L$;

FIG. 10 is a diagram illustrating an approximation to the sampling period L;

FIG. 11 is a block diagram of a texture generation apparatus in accordance with the present invention;

FIG. 12 is a diagram illustrating eight orientation addressing;

FIG. 13A-H are diagrams of a pair of arbitrary geometric shapes and their rotation and inversion when addressed as shown in FIG. 12;

FIG. 14 is a diagram illustrating memory hierarchy for texture modulation intensity addressing;

FIGS. 15 and 16 are photographs illustrating the ornamental effect generated by a digital image generator employing texture generation in accordance with the present invention without and with, respectively, smooth detail level transition (mixing);

FIG. 17 is a diagram illustrating level mixing as a function of $\log_2 L$;

FIGS. 18 and 19 are photographs illustrating the ornamental effect generated by a digital image generator employing texture generation in accordance with the present invention without and with, respectively, close and far texture modulation intensity interpolation;

FIG. 20 is a diagram illustrating a super tile with four texture tiles, each of which has four-by-four texture elements;

FIG. 21 is a diagram illustrating one of the texture elements shown in FIG. 20.

BEST MODE FOR CARRYING OUT THE INVENTION

Figure 1:
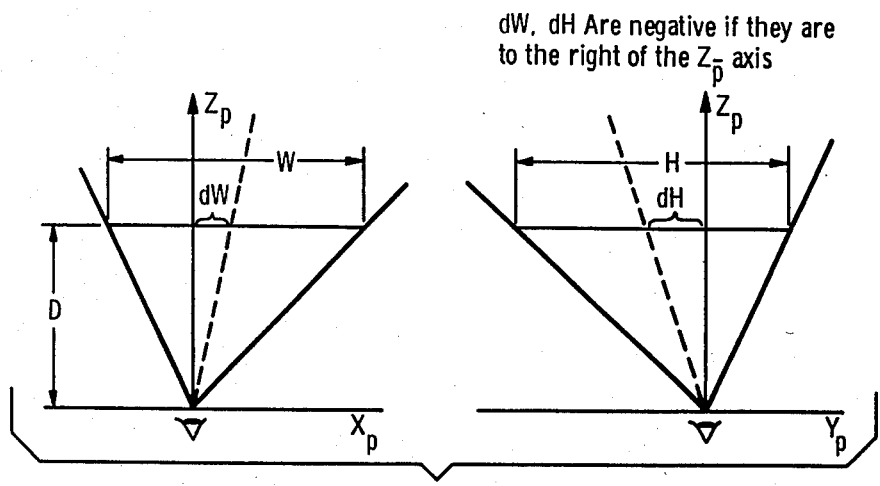
FIG. 1 is a diagram of the image plane with the pilot's eye off-center.

As previously indicated, in accordance with the present invention, texture is generated for each surface (planar or quadric) which is to receive texture by adding to the intrinsic intensity of the surface a texture modulation intensity (for each display color) for each picture element (pixel) on the screen occupied by the visible portion of the surface. The texture modulation intensity at a particular pixel occupied by the visible portion of the surface is obtained in the following manner. First, the screen coordinates ($X_s$, $Y_s$, $Z_s$) of the surface visible at that pixel ($X_s$, $Y_s$) are inverse transformed into a two-dimensional (2-D) texture mapping space ($X_t$, $Y_t$), i.e., $$(X_s, Y_s, Z_s) \xrightarrow{\text{inverse transformation}} (X_t, Y_t).$$

Next, the transformed coordinates ($X_t$, $Y_t$) are used as X and Y addresses to access a two-dimensional (2-D) texture modulation intensity pattern table to look up the corresponding texture modulation intensity. Finally, the texture modulation intensity is added to the intrinsic intensity of the corresponding pixel. This process is referred to herein as mapping texture modulation intensities onto a surface through the two-dimensional (2-D) texture mapping space ($X_t$, $Y_t$). If texture patterns resembling real world texture are defined on the texture mapping space, then realistic real world texture is mapped onto designated surfaces.

A necessary and sufficient condition for a two-dimensional (2-D) texture mapping space to map spatially fixed texture onto a surface is that the screen coordinates of all points on the surface always inversely transform into unique points in the texture mapping space. For surfaces (moving or stationary) to be textured, there are, in general, many "valid" texture mapping spaces that satisfy this condition. For stationary surfaces, a texture mapping space defined on the ground plane ($X_e$, $Y_e$ plane, where the subscript e indicates earth coordinates) satisfies the above condition. Moreover, for stationary surfaces, any two-dimensional (2-D) texture mapping space defined on any plane in the earth (environment) coordinate system satisfies the condition. For moving surfaces, two-dimensional (2-D) mapping spaces defined on planes which move with the moving surface also satisfy the condition. texture mapping spaces (for both stationary and moving surfaces) is given by the equations:

$$X_t = C_1 + \frac{C_2 X_s + C_3 Y_s + C_4}{Z_s} \text{ and}$$

$$Y_t = C_5 + \frac{C_6 X_s + C_7 Y_s + C_8}{Z_s},$$

where the $C_i$'s are constants (for each frame) dependent on the particular texture mapping space and $Z_s$ is dependent on the geometry of the surface. For planar surfces, $Z_s$ is linearly related to $X_s$ and $Y_s$ by the equation:

$$Z_s = B_1 X_s + B_2 Y_s + B_3,$$

where $B_i$'s are constants (for each frame) dependent on the orientation of the planar surface. It should be noted that the numerator and denominator of the quotient terms can be incrementally generated.

Since the constants associated with the numerator in the quotient terms are dependent upon the texture mapping space used, hardware is saved when the same texture mapping space is used for all textured surfaces. The preferred texture mapping space for all surfaces is the ground plane mapping space mentioned earlier. Texture mapped onto surfaces through the ground plane mapping space is referred to herein as ground mapped texture. For the ground plane mapping space ($X_e$-$Y_e$), the inverse transformation is given by the equations:

$$X_e = X_o + \frac{U_{11} X_s + U_{21} Y U_{31}}{Z_s} \text{ and}$$

$$Y_e = Y_o + \frac{U_{21} X_s + U_{22} Y_s + U_{32}}{Z_s},$$

where $X_o$ and $Y_o$ are the X and Y coordinates of the pilot's eyes on the earth coordinate system and the $U_{ij}$'s are constants for each frame. (The deviation of these equations follows shortly.) As mentioned earlier, $Z_s = B_1 X_s + B_2 Y_s + B_3$ for planar surfaces, where the $B_i$'s are constants for each frame dependent on the orientation of the planar surface. Therefore, in order to evaluate $X_e$ and $Y_e$ the $B_i$'s have to be calculated for each frame for each textured planar surface.

The effect of using the ground plane mapping space for texture mapping is to orthographically project texture on the ground plane to the surface. Thus, texture is stretched in proportion to the inclination of the surface to the ground.

One problem with using ground mapping is that texture cannot be put on planes perpendicular to the ground. In general, texture cannot be put on planes perpendicular to the plane on which the mapping space is defined. This, however, is overcome by using $X_e$-$Z_e$ plane or $Y_e$-$Z_e$ plane mapping instead of ground plane mapping (i.e., $X_e$-$Y_e$ plane mapping) for planes perpendicular to the ground. Thus, to allow texture to be put on planes of all orientation, an inverse transformation is made using three coordinates ($X_e$, $Y_e$, $Z_e$) instead of two. The appropriate two coordinates are then used to access the two-dimensional (2-D) texture lookup modulation intensity pattern table.

Surface mapped texture on a planar surface refers to texture mapped onto the planar surface through mapping spaces defined on the planar surface. If surface mapped texture is applied to all planar surfaces then the $C_i$'s of the above equations have to be calculated for each individual surface, resulting in a slight increase in the computation required over ground plane mapping discussed above. This approach has the effect of having a two-dimensional (2-D) texture wallpaper glued on each surface.

Intersecting quadric surfaces (hyperboloids) have been demonstrated as being effective in simulating mountain ranges. However, if only smooth shading is applied on these quadric surfaces, the mountain ranges appear too smooth. To add some irregularities to the surfaces of mountain ranges, texture is superimposed on the quadric surfaces. The preferred mapping space for quadric surfaces simulating mountain ranges is the ground mapping space. As mentioned earlier, in order to perform the inverse transformation from screen coordinates to the ground mapping space, $Z_s$ has to be obtained. Unlike planar surfaces, $Z_s$ for quadric surfaces is not linearly related to $X_s$ and $Y_s$. However, an incremental technique to calculate $Z_s$ for quadric surfaces follows. Given $Y_s$, the conic formed by the intersection of the scan plane associated with $Y_s$ and the quadric surface is given by the equation:

$$\underbrace{A_1 X_s^2}_{a} + A_2 Z_s^2 + A_3 X_s Z_s + A_4 X_s + A_5 Z_s + A_6 = 0 \text{ or}$$

$$\underbrace{A_2 Z_s^2}_{a} + \underbrace{(A_3 X_s + A_5) Z_s}_{b} + \underbrace{A_1 X_s^2 + A_4 X_s + A_6}_{c} = 0.$$

Thus, $Z_s$ is given by:

$$Z_s = \frac{-b \pm \sqrt{b^2 - 4ac}}{2a}.$$

If $A_2 = 1$ (i.e., the equation is normalized), then $$Z_s = -b \pm \sqrt{b^2 - 4c}.$$

Since b is linear with $X_s$ and ($b^2 - 4c$) is quadratic with $X_s$, b and ($b^2 - 4c$) can be incrementally generated. The larger of the two solutions is used since $Z_s$ is the inverse Z depth.

The derivation of the equations for the inverse transformation from the screen coordinates of a point on a surface (planar or quadric) to its earth coordinates is now in order. The derivation is for the general case where the pilot's eye is off the center of the image plane as illustrated in FIG. 1. This is the case where the pilot's eye can be moved around the center point of a dome to judge the distance from a close aircraft using the parallax effect. It is usually necessary to project objects onto an imaginary image plane rather than the true image plane to correct for the fact that the projector is not located at the pilot's eye. The pilot's eye is in general off center with respect to the imaginary image plane. Note that where the pilot's eye is not off center, dW and dH in FIG. 1 are zero.

First, let the matrix:

$$[H] = \begin{bmatrix} H_{11} & H_{12} & H_{13} \\ H_{21} & H_{22} & H_{23} \\ H_{31} & H_{32} & H_{33} \end{bmatrix},$$

be the orientation matrix of the image plane with respect to the earth coordinate system. [H] is an orthonormal matrix, i.e.:

$$[H]^{-1} = [H]^T$$

and $$det[H] = 1.$$

Now, let (Xe, Ye, Ze) be the earth coordinates of the point on the surface; and, let (Xo, Yo, Zo) be the earth coordinates of the pilot's eye. The pilot's eye coordinates of the point are given by the equation:

$$\begin{bmatrix} Xp \\ Yp \\ Zp \end{bmatrix} = [H] \begin{bmatrix} Xe - Xo \\ Ye - Yo \\ Ze - Zo \end{bmatrix}.$$

Since the clipping algorithm assumes a 90°×90° view window and a centered pilot's eye, it is necessary to scale the pilot's eye coordinates of the point before using the existing clipping algorithm. The scaled pilot's eye coordinates ($Xp^1$, $Yp^1$, $Zp^1$) are given by the equation:

$$\begin{bmatrix} Xp^1 \\ Yp^1 \\ Zp^1 \end{bmatrix} = \begin{bmatrix} \frac{2D}{W} & 0 & \frac{2dW}{W} \\ 0 & \frac{2D}{H} & \frac{2dH}{H} \\ 0 & 0 & 1 \end{bmatrix} \begin{bmatrix} Xp \\ Yp \\ Zp \end{bmatrix}.$$

By letting:

$$a = \frac{2D}{W}, b = \frac{2dW}{W},$$

$$c = \frac{2D}{H}, d = \frac{2dH}{H},$$

it follows that:

$$Xp^1 = a\,Xp + b\,zp,$$

$$Yp^1 = c\,Yp + d\,Zp$$

and $$Zp^1 = Zp.$$

Finally, by using the original pilot's eye coordinate equation to expand the above scaled pilot's eye coordinate equations, it follows that:

$$\begin{bmatrix} Xp^1 \\ Yp^1 \\ Yp^1 \end{bmatrix} = \begin{bmatrix} a & 0 & b \\ 0 & c & d \\ 0 & 0 & 1 \end{bmatrix} \begin{bmatrix} H_{11} & H_{12} & H_{13} \\ H_{21} & H_{22} & H_{23} \\ H_{31} & H_{32} & H_{33} \end{bmatrix} \begin{bmatrix} Xe - Xo \\ Ye - Yo \\ Ze - Zo \end{bmatrix} =$$

$$Hs$$

$$[Hs] \begin{bmatrix} Xe - Xo \\ Ye - Yo \\ Ze - Zo \end{bmatrix}.$$

The screen coordinates of the point are given by the equations:

$$Xs = NPE \cdot \frac{Zp^1 + Xp^1}{2Zp^1},$$

$$Ys = NSL \cdot \frac{Zp^1 + Yp^1}{2Zp^1} \text{ and}$$

$$Zs = \frac{1}{Zp^1},$$

where NPE = number of picture elements (pixels) along a scanline and NSL = number of scanlines. In rearranged form, the screen coordinates of the point are given by the equations:

$$\frac{Xp^1}{Zp^1} = \frac{2}{NPE} Xs - 1 \text{ and}$$

$$\frac{Yp^1}{Zp^1} = \frac{2}{NSL} Ys - 1.$$

From the non-expanded scaled pilot's eye coordinate equations and the original screen coordinates of the point equations, it follows that:

$$Xp = (AXs + B)Zp$$

and $$Yp = (CYs + D)Zp,$$

where $$A = \frac{2}{NPE \cdot a}, B = -\frac{b+1}{a},$$

$$C = \frac{2}{NSL \cdot c} \text{ and } D = -\frac{d+1}{c}.$$

Rearranging the latter scaled pilot's eye coordinate equations yields:

$$\begin{bmatrix} Xe \\ Ye \\ Ze \end{bmatrix} = \begin{bmatrix} Xo \\ Yo \\ Zo \end{bmatrix} + [Hs]^{-1} \begin{bmatrix} Xp^1 \\ Yp^1 \\ Zp^1 \end{bmatrix} = \begin{bmatrix} Xo \\ Yo \\ Zo \end{bmatrix} +$$

$$[Zp^1][Hs]^{-1} \begin{bmatrix} Xp^1/Zp^1 \\ Yp^1/Zp^1 \\ 1 \end{bmatrix}.$$

Next, by substituting the second form of the equations for the screen coordinates of the point into the above equation, it follows that:

$$\begin{bmatrix} Xe \\ Ye \\ Ze \end{bmatrix} = \begin{bmatrix} Xo \\ Yo \\ Zo \end{bmatrix} + Zp^1 [Hs]^{-1} \begin{bmatrix} \frac{2Xs}{NPE} - 1 \\ \frac{2}{NSL} Ys - 1 \\ 1 \end{bmatrix}.$$

Since $$Zp^1 = Zp = 1/Zs$$

it follows that:

$$\begin{bmatrix} Xe \\ Ye \\ Ze \end{bmatrix} = \begin{bmatrix} Xo \\ Yo \\ Zo \end{bmatrix} + \frac{[Hs]^{-1}}{Zs} \begin{bmatrix} \frac{2Xs}{NPE} - 1 \\ \frac{2}{NSL} Ys - 1 \\ 1 \end{bmatrix}.$$

Finally, by expanding the above equations, the equations for the inverse transformation from the screen coordinates to the ground plane mapping space result. Specifically:

$$Xe = Xo + \frac{U_{11} Xs + U_{21} Ys + U_{31}}{Zs},$$

$$Ye = Yo + \frac{U_{12} Xs + U_{22} Ys + U_{32}}{Zs} \text{ and}$$

$$Ze = Zo + \frac{U_{13} Xs + U_{23} Ys + U_{33}}{Zs},$$

where $$U_{11} = \frac{2 H_{11}}{NPE\, a}, \quad U_{21} = \frac{2 H_{21}}{NSL\, c},$$

$$U_{31} = \frac{b-1}{a} H_{11} + \frac{d-1}{c} H_{21} + H_{31}$$

$$U_{12} = \frac{2 H_{12}}{NPE\, a}, \quad U_{22} = \frac{2 H_{22}}{NSL\, c},$$

$$U_{32} = \frac{b-1}{a} H_{21} + \frac{d-1}{c} H_{22} + H_{32}$$

$$U_{13} = \frac{2 H_{13}}{NPE\, a}, \quad U_{23} = \frac{2 H_{23}}{NSL\, c}, \text{ and}$$

$$U_{33} = \frac{b-1}{a} H_{13} + \frac{d-1}{c} H_{23} + H_{33}.$$

As previously indicated, in accordance with the present invention, the preferred method of texture generation includes the initial steps of obtaining texture modulation intensities, filtering the intensities to prevent aliasing, and storing the filtered intensities in a two-dimensional texture modulation intensity table. The preferred method of obtaining texture modulation intensities is from digitized real world aerial photographs. Alternatively, texture patterns may be obtained by creating certain two-dimensional (2-D) frequency spectrums (perhaps according to some wanted frequency properties) and doing a two-dimensional (2-D) inverse Fast Fourier Transform (FET).

After obtaining texture modulation intensities, the preferred method of texture generation includes the step of filtering the intensities to prevent aliasing (manifest as dynamic scintillation of a scene). Since texture is generated by table look-up for each pixel on the screen which is associated with a textured surface, each pixel which is associated with a textured surface "samples" an intensity modulation value from the texture look-up table and adds this value to the intrinsic intensity of the surface at that pixel. Therefore, texture generation may be viewed as a two-dimensional (2-D) sampling process.

Figure 2:
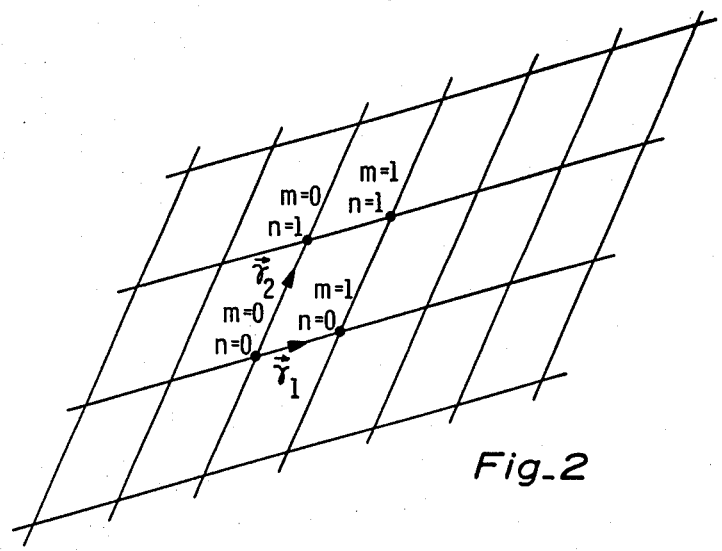
FIG. 2 is a diagram of a sampling lattice in the spatial domain.

To understand the antiliasing approach, it is important to understand the two-dimensional sampling theorem. Let a pattern be sampled by a sampling lattice such as that which is shown in FIG. 2. Let the sampling points of the sampling lattice be defined by the position vectors:

$$\gamma m_n = m\gamma_1 + n\gamma_2.$$

Figure 3:
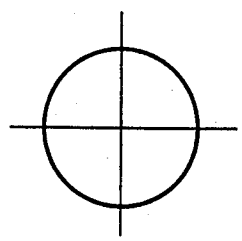
FIG. 3 is a diagram representing the spectrum of an intensity picture.

If $|\gamma_1| = |\gamma_2|$ and $\gamma_1$ and $\gamma_2$ are orthogonal, a square sampling lattice results. The general case, however, is that of a parallelogram sampling lattice as shown in the figure. Let the frequency spectrum of the intensity pattern be as shown in FIG. 3. Then, the frequency spectrum of the sampled intensity pattern is as shown in FIG. 4. In FIG. 4 it can be seen that the frequency spectrum of the original pattern is replicated over a "reciprocal lattice" in the frequency domain. The position vectors of the reciprocal lattice (indicated by small dots) are given by:

$$W_{mn} = mW1 + nW2,$$

The relationship between the sampling lattice in the spatial domain and the reciprocal lattice in the frequency domain is given by:

$$\gamma_1 W_2 = \gamma_2 W_1 = 0$$

and $$\gamma_1 W_1 = \gamma_2 W_2 = 1.$$

The first equation implies that $\gamma_1$ and $\gamma_2$ are orthogonal to $W_2$ and $W_1$, respectively. Let $\theta$ be the angle between $\gamma_1$ and $\gamma_2$. The second equation implies that:

$$|W_1| = 1/(|\gamma_1| \sin \theta)$$

and $$|W_2| = 1/(|\gamma_2| \sin \theta)$$

The latter equations imply that the more dense the sampling lattice is in the spatial domain, the more sparse will be the replications of the original frequency spectrum in the frequency domain. The sampling theorem indicates that to avoid aliasing, the frequency spectrums of the replications should not overlap.

Thus, aliasing may be avoided by making the sampling lattice dense enough so that no overlap of the frequency spectrums occurs or by "band limiting" the intensity pattern frequency spectrum by "low pass" filtering the original intensity pattern so that no overlap of the filtered frequency spectrum occurs. In FIG. 4 the original intensity pattern should be bandlimited with the parallelogram passband "$V_1 V_2 V_3 V_4$". In the sampling process of texture generation, however, the sampling lattice is a function of the orientation of the surface receiving texture and the distance of the viewpoint from it. Therefore, there is no control over the sampling lattice. Thus, the second method, that of limiting the original intensity pattern (to a degree depending on the density of the sampling lattice) before sampling, is employed.

As mentioned earlier, the more sparse the sampling lattice, the more dense is the reciprocal lattice. Consequently, the more sparse the sampling lattice, the more "low passed" the original frequency intensity spectrum has to be to avoid aliasing. Therefore, to avoid aliasing in texture generation, a measure of the density of the sampling lattice is used in selecting the appropriately low passed texture intensity pattern.

Hereafter, a method of obtaining the sampling lattice as well as a measure of the density of sampling lattice at a particular pixel associated with a surface receiving texture is disclosed. Also disclosed are methods of obtaining texture intensity patterns with different degrees of low pass filtering. Let the pixel under consideration be denoted "A". It is desired to find the sampling lattice for this pixel. This sampling lattice is then used to select the appropriately low pass filtered texture modulation intensity pattern. Let the pixel to the left of pixel A be denoted "B"; and, let the pixel above pixel A be denoted "C". These three pixels are depicted in FIG. 5. In FIG. 5, these three pixels on the screen are shown to be inverse transformed into three points, "a", "b" and "c", on the ground plane. Let "d" be the point on the ground which forms a parallelogram with a, b and c. Parallelogram "a b c d" then approximates the parallelogram sampling lattice at pixel A.

Now, a discussion of the Hadamard Transformation is in order. Let the reciprocal lattice corresponding to the parallelogram sampling lattice a b c d in FIG. 5 be as shown in FIG. 6 (indicated by small dots). To avoid aliasing, the frequency spectrum has to be bandlimited to the parallelogram "V₁ V₂ V₃ V₄" as shown in the figure. If texture intensity is represented in the frequency domain or transform domain, i.e., represented by its frequency components or transform coefficients, then texture intensity may be bandlimited by taking only the frequencies or transform coefficients within the parallelogram through the inverse transform to the spatial domain. Many types of transforms exist for the representation of texture. Among these transforms, the Hadamard transform appears to be the most efficient one as far as computation is concerned. The computation of the inverse Hadamard transform involves only additions while most other transforms involve multiplications.

Next, the Hadamard transform is introduced. Let (f) be an N by N matrix whose elements represent the texture modulation intensities of an N by N texture pattern. Let (F) be another N by N matrix representing the Hadamard transform of (f). (F) is defined as follows:

$$(F) = (H)(f)(H),$$

where (H) is an N by N Hadamard matrix with element values of ±1 only. The inverse Hadamard transform is given by:

$$(f) = \frac{1}{N^2}(H)(F)(H).$$

From the above equation it follows that:

$$(f) = \frac{1}{N^2}\begin{bmatrix}HR_1\\HR_2\\\vdots\\HR_N\end{bmatrix}(F)(HC_1\ HC_2\ \ldots\ HC_N),$$

where $HR_i$ is an 1 by N row matrix corresponding to the $i^{th}$ row of (H) and $HC_j$ j is an N by 1 column matrix corresponding to the $j^{th}$ column of (H). Let $f_{mn}$ be an element of (f) in row m and column n. From the preceding equation, it may be seen that:

$$f_{mn} = \frac{1}{N^2}(HR_m)(F)(HC_n) = \frac{1}{N^2}\sum_{i=1}^{N}\sum_{j=1}^{N}HR_m^i \cdot HC_n^j F_{ij},$$

where $HR_m^i$ and $HC_n^j$ are the $i^{th}$ element and $j^{th}$ elements of $HR_m$ and $HC_n$ respectively. Since the elements of $HR_m$ and $HC_n$ have values of ±1 only, $f_{mn}$ can be obtained by the sum of the N² elements of (F). The sign to be associated with a certain element $F_{ij}$ of (F) in the sum is obtained as follows. Let logic "1" represent +1 and logic "0" represent −1 in the Hadamard matrix. Let sign (i, j)=$HR_m^i \oplus HC_n^j$. If sign (i,j)=0 then $F_{ij}$ will be used in the sum; otherwise, −$F_{ij}$ will be used in the sum.

To avoid aliasing, the sampling lattice a b c d is used to generate the parallelogram passband V₁ V₂ V₃ V₄. The $F_{ij}$'s outside this passband are turned to zero so that the transform coefficients outside the passband are suppressed in accordance with the two-dimensional sampling theorem.

To simplify the transform coefficients suppression operation the largest inscribing square "V₅ V₆ V₇ V₈" (illustrated in FIG. 6) to the parallelogram is used as the passband. This largest inscribing square corresponds to a square sampling lattice "a¹ b¹ c¹ d¹" as shown in FIG. 5. The side length of square a¹ b¹ c¹ d¹ (henceforth referred to as the sampling period) is given by:

$$L=\text{MAX}\{|Ye_c - Ye_a| + |Xe_c - Xe_a|,$$
$$|Xe_b - Xe_a| + |Ye_b - Ye_a|\}.$$

Hence, when square passbands are used for antialiasing, the sampling period L should be used to choose the appropriate square passband to avoid aliasing.

Next, the derivative of the preceding equation is in order. The sampling lattice in the spatial domain and its corresponding reciprocal lattice in the frequency domain is shown in FIGS. 7 and 8, respectively. The relationships between the vectors in these two figures are given by the equations:

$$V_1 \cdot W_2 = V_2 \cdot W_1 = 0$$

and $$V_1 \cdot W_1 = V_2 \cdot W_2 = 1.$$

In other words, V₁ and V₂ are orthogonal to W₂ and W₁, respectively, and, $$|W_1| = 1/(|V_1|\ \text{SIN}\ \theta)$$

and $$|W_2| = 1/(|V_2| \sin \theta),$$

where $\theta$ is the angle between $V_1$ and $V_2$.

The sampling period L is the side length of the square sampling lattice in the spatial domain corresponding to the largest inscribing square reciprocal lattice to the parallelogram A B C D. Therefore, the sampling period is given by the reciprocal of the side length of the largest inscribing square of parallelogram A B C D, since $\theta = 90°$, $|W_1| = 1/|V_1|$ and $|;i W_2 = 1/|V_2|$ for a square sampling lattice.

In FIG. 8 Point E is the intersection of the side CD (or its extension) with a 45° line passing through B. Point F is the intersection of the side AD (or its extension) with the same line. It may be seen that the side length of the largest inscribing square of the parallelogram is given by:

$$= \text{MIN} \frac{BF}{\sqrt{2}}, \frac{BE}{\sqrt{2}},$$

where BF and BE are at an angle of 45° to the horizontal line. From the equation:

$$|W_1| = 1/(|V_1| \sin \theta),$$

it follows that:

$$AB = 1/(|V_1| \sin \theta)$$

and $$BG = AB \cdot \sin \theta = 1/|V|.$$

However, $$BF = \frac{BG}{\cos(\theta_1 - 45°)}$$

$$= \frac{1}{|\vec{V_1}| (\cos\theta_1 \cos 45° + \sin\theta_1 \sin 45°)} \text{ and}$$

$$\frac{BF}{\sqrt{2}} = \frac{1}{|\vec{V_1}| (\cos\theta_1 + \sin\theta_1)}.$$

Similarly, $$\frac{BE}{\sqrt{2}} = \frac{1}{|\vec{V_2}| (\cos\theta_2 + \sin\theta_2)}.$$

Thus, the sampling period L is given by $$L = \frac{1}{l} = \text{MAX}\left(\frac{\sqrt{2}}{BF}, \frac{\sqrt{2}}{BE}\right)$$

$$= \text{MAX}\{|\vec{V_1}| (\cos\theta_1 + \sin\theta_1), |\vec{V_2}| (\cos\theta_2 + \sin\theta_2)\}$$

$$= \text{MAX}\{|Xe_b - Xe_a| + |Ye_b - Ye_a|,$$

$$|Xe_c - Xe_a| + Ye_c - Ye_a|\},$$

completing the derivation of the equation of the sampling period.

Finally, a discussion of the spatial domain representation of texture intensity patterns with different degrees of low pass filtering is in order. The inverse transformation for each pixel receiving texture required by the above transform domain representation of texture may be avoided by low pass filtering the original texture intensity pattern with different square passbands and storing the filtered intensity pattern. The size of the texture intensity pattern table is equal to S by N, where S is the size of the table for the original texture intensity pattern and N is the number of different degrees of low pass filtered intensity patterns that are to be stored (including the original texture intensity pattern).

To reduce the total size of the table required to store the different degrees of low pass filtered intensity patterns, a binary jump method described below is employed. Let the original texture intensity pattern have $2^M$ by $2^M$ texture elements representing an area of $2^M$ by $2^M$ unit$^2$. Therefore, in the original texture intensity pattern each texture element represents an area of one unit$^2$. This is referred to herein as the level "zero" representation of the original texture intensity pattern. Level "one" representation has $2^{M-1}$ by $2^{M-1}$ texture elements each representing an area of 4 unit$^2$. The intensity of texture elements in level "one" is given by the average of the four texture elements in level "zero" covering the same four unit$^2$ area. Level "one" is in effect a low pass filtered version of level "zero". Similarly, level l has $2^{M-l}$ by $2^{M-l}$ elements each representing an area of $2^{2l}$ unit$^2$. The intensity of elements in level "l" is given by the average of the $2^{2l}$ texture elements in level "zero" covering the same $2^{2l}$ unit$^2$ area. Thus, the higher the level number, the more low pass filtered is the texture intensity pattern. Eventually, the highest numbered level (level "M" in this case) has only one texture element whose intensity is given by the average of $2^{2M}$ texture elements in level "zero". The total table size is therefore:

$$\frac{S}{\{2^0\}^2} + \frac{S}{\{2^1\}^2} + \frac{S}{\{2^2\}^2} + \cdots \frac{S}{\{2^l\}^2} + \cdots 1 \leq \frac{4}{3} S,$$

where S is the size of level "zero".

The maximum frequency component of level "zero" in both directions is $\frac{1}{2}$ cycle/unit. In accordance with the two-dimensional sampling theorem, a sampling rate of greater than or equal to 1 sample/unit (twice the maximum frequency) will ensure no aliasing. Similarly, the maximum frequency component of level "one" is $\frac{1}{4}$ cycles/unit in both directions. A sampling rate of greater than or equal to $\frac{1}{2}$ sample/unit will ensure no aliasing. Therefore, aliasing is avoided by choosing level "zero" when $L \leq 1$ unit (sampling period $L = 1$/sampling rate). Level "one" is chosen when 1 unit $< L \leq 2$ units. In general, if $2^{l-1}$ unit $< L \leq 2^l$ unit, (or $l - 1 < \log_2 L \leq l$) level "l" is chosen. When $L > 2^{M-1}$ unit, level "M" is used. This is illustrated in FIG. 9 for $M = 6$. Notice that a higher level of detail corresponds to a lower level number. The chosen spatial domain representation of texture over transform domain representation is preferred because the former requires less computation even though the memory space required is a little more.

As previously indicated, the measure of the density of sampling lattice which is used to select the appropriate level of detail of texture is given by the sampling period:

$$L = \text{MAX}\{|Ye_c - Ye_a| + Xe_c - Xe_a|,$$

$$L_1$$

-continued
$$|Xe_b - Xe_a| + Ye_b - Ye_a|\}.$$

$L_2$

Since $Ye_c$ and $Xe_c$ are earth coordinates of a pixel in the previous scanline, a scanline buffer is required to store $Ye_c$ and $Xe_c$ for pixels in the previous scanline. Hereafter, an approximation to the sampling period L is disclosed which requires no scanline buffer and which permits the approximated sampling period to be evaluated earlier in the texture generation pipeline, thus, shortening the pipeline. From FIG. 10 it may be seen that:

$$L_1 \leq \sqrt{2} \{(Ye_c - Ye_a)^2 + (Xe_c - Xe_a)^2\}^{\frac{1}{2}} = \sqrt{2}\, l_1 \text{ and}$$

$$L_2 \leq \sqrt{2} \{(Ye_b - Ye_a)^2 + (Xe_b - Se_a)^2\}^{\frac{1}{2}} = \sqrt{2}\, l_2.$$

However, since the distance between two points is invariant under rotation and translation transformation, it follows that:

$$\{(Xe_c - Xe_a)^2 + (Ye_c - Ye_a)^2 + (Ze_c - Ze_a)^2\}^{\frac{1}{2}}$$
$$= \{(Xp_c - Xp_a)^2 + (Yp_c - Yp_a)^2 + (Zp_c - Zp_a)^2\}^{\frac{1}{2}} = l_3$$

and $$\{(Xe_b - Xe_a)^2 + (Ye_b - Ye_a)^2 + (Ze_b - Ze_a)^2\}^{\frac{1}{2}}$$
$$= \{(Xp_b - Xp_a)^2 + (Yp_b - Yp_a)^2 + (Zp_c - Zp_a)^2\}^{\frac{1}{2}} = l_4,$$

where the subscript p indicates pilot's eye coordinates. Now, since $l_3 \leq l_1$ and $l_4 \geq l_2$, it follows that:

$$L_1 \leq \sqrt{2}\, l_3 \text{ and}$$

$$L_1 \leq \sqrt{2}\, l_4.$$

Substitution of the above two equations into the equation for the sampling period L yields:

$$L \leq \max \{\sqrt{2}\, l_3, \sqrt{2}\, l_4\}.$$

In order to save a scanline buffer and to shorten the texture generation pipeline an approximated sampling period $L^1$ is used given by the equation:

$$L^1 = \max \{\sqrt{2}\, l_3, \sqrt{2}\, l_4\},$$

to select the appropriate level of detail of texture. Since $L^1 \geq L$, the effect of using $L^1$ instead of L is that a level of detail lower or equal to that indicated by L is chosen. This is the price paid for using $L^1$ instead of L. However, tests indicate that most of the time (especially for planes at a small angle to the ground plane on which the mapping space is defined) $L^1$ is quite close to L. As previously indicated, choosing a higher level of detail of texture than indicated by L gives rise to aliasing. However, since $L^1 > L$, using $L^1$ instead of L for level of detail selection guarantees that this will not occur.

Next an approximation to $l_3$ and $l_4$ is derived. Since, as previously indicated, $$Xp = (AX_s + B)Zp$$

and $$Yp = (CY_s + D)ZP,$$

where A, B, C and D are constants and A and $C \ll 1$, it follows that:

$$Xp_c - Xp_a = (AX_{s_a} + B)(Zp_c - Zp_a)\, (\because X_{s_c} = X_{s_a}),$$
$$Yp_c - Yp_a = (C[Y_{s_a} - 1] + D)Zp_c -$$
$$\qquad (Cy_{s_a} + D)Zp_a (\because Y_{s_c} = Y_{s_a} - 1),$$
$$= (CY_{s_a} + D)(Zp_c - Zp_a) - CZp_c \text{ and}$$
$$Zp_c - Zp_a = Zp_c - Zp_a.$$

However, $$\therefore l_3 = \{(Xp_c - Xp_a)^2 + (Yp_c - Yp_a)^2 + (Zp_c - Zp_a^2\}^{\frac{1}{2}}$$

$$l_3 = \sqrt{[1 + (AX_{s_a} + B)^2 + (CY_{s_a} + D)^2(Zp_c - Zp_a)^2 +}$$
$$\overline{C^2 Zp_c^2 - 2CZp_c(CY_{s_a} + D)(Zp_c - Zp)}.$$

Since $C \ll 1$ the first term under the square root sign dominates when $Zp_c \neq Zp_a$. When $Zp_c = Zp_a$ (i.e., the planar surface is parallel to the image plane) the second term under the square root sign dominates. Therefore, a good approximation to $l_3$ is:

$l_3 \doteq$ max of $$\{\sqrt{1 + (AX_{s_a} + B)^2 + (CY_{s_a} + D)^2}\, (Zp_c - Zp_a), CZp_c\}.$$

Also since:

$$Z_{s_a} - Z_{s_c} = \frac{dZ_s}{dY_s},$$

where $dZ_s/dY_s$ is the slope of $Z_s$ in the $Y_s$ direction and is constant for planar surfaces; and, $1/Zp = Z_s$ (as previously indicated), it follows that:

$$\frac{1}{Zp_a} - \frac{1}{Zp_c} = \frac{dZ_s}{dY_s} \text{ or } Zp_c - Zp_a = Zp_a Zp_c \frac{dZ_s}{dY_s}.$$

Assuming $Zp \doteq Zp_c$, $l_3$ can be approximated by:

$l_3 \doteq$ max of $$\left\{ \sqrt{1 + (AX_{s_a} + B)^2 + (CY_{s_a} + D)^2}\, Zp_a^2 \frac{dZ_s}{dY_s}, CZp_a \right\}$$

$=$ max of $$\left\{ \sqrt{1 + (AX_{s_a} + B)^2 + (CY_{s_a} + D)^2}\, \frac{\frac{dZ_s}{dY_s}}{Z^2_{s_a}}, \frac{C}{Z_{s_a}} \right\},$$

Similarly, $l_4$ can be approximated by:

$l_4 \doteq$ max of $$\left\{ \sqrt{1 + (AX_{s_a} + B)^2 + (CY_{s_a} + D)^2} \frac{\frac{dZ_s}{dX_s}}{Z_{s_a}^2}, \frac{A}{Z_{s_a}} \right\}.$$

The square root term is identical to the range correction term. This range correction term is necessary to obtain the true slant range for better fading. Since the term under the square root sign is quadratic in Xs, it can be incrementally calculated along a scanline with two additions. If the pilot's eye point is not allowed to move with respect to the view window, then A, B, C and D are constants for the whole mission; and, this range correction term can be obtained by table lookup. Tests indicate that 5 significant bits are usually sufficient for the square root term dZs/dXs, dZs/dYs and Zs. Therefore, relatively small lookup tables are required for the computation of $l_3$ and $l_4$.

Since the approximation to $l_3$ and $l_4$ involves only screen coordinates of the pixel under consideration and the derivatives of Zs with respect to Xs and Ys (both are constant for a planar surface), no scanline buffer is required for their evaluation.

It should be noted that evaluation of L requires earth coordinate values which are not available until the inverse transformation from the screen coordinates to the earth coordinates is completed. On the other hand, $L^1$ evaluation can be started once the screen coordinates are obtained, thus, shortening the texture generation pipeline.

The above approximation is valid only for planar surfaces. For quadric surfaces, the scanline buffer approach is preferred.

Notice that the first term in the bracelet of $l_3$ and $l_4$ differs in one value, namely dZs/dYs in $l_3$ and dZs/dXs in $l_4$.

Let $$DZIMAX = \left\{ MAX \frac{dZ_s}{dX_s}, \frac{dZ_s}{dY_s} \right\}$$

and call the square root term R, the range to Z correction factor.

Since the approximated sampling distance $L^1$ is given by $$L^1 = MAX \{\sqrt{2}\, l_3, \sqrt{2}\, l_4\},$$

$L^1$ is given in terms of DZIMAX by $$L^1 = MAX \left( R \frac{DZIMAX}{Z_{s_a}^2}, \frac{C}{Z_{s_a}}, \frac{A}{Z_{s_a}} \right) \sqrt{2}$$

$$= MAX \left( R \frac{DZIMAX}{Z_{s_a}^2}, \frac{MAX(A,C)}{Z_{s_a}} \right) \sqrt{2}$$

Letting $Z = 1/Z_{s_a}$, we have $$L^1 = MAX \{Z^2 \cdot R \cdot DZIMAX, Z \cdot MAX(A,C)\} \sqrt{2}.$$

After obtaining and filtering the texture modulation intensities, as previously indicated, the preferred method of texture generation includes the step of storing the filtered intensities. Since surfaces to be textured may be very large, even at a low resolution, the size of the table required to assign texture intensity modulation to the entire two-dimensional (2-D) mapping space may be prohibitively large. Therefore, a "tile method" is employed.

Specifically, a texture tile consists of $2^n$ by $2^n$ texture modulation intensity elements are stored in a ramdom access memory (RAM) table. Each texture element covers one square unit. The definition of a unit is dependent on the resolution required for the mission. A texture tile covers $2^n$ by $2^n$ square units.

The simplest method of covering the entire two-dimensional (2-D) space is by repeating this $2^n$ by $2^n$ square unit tile over it. However, this is generally not acceptable since the resulting texture pattern looks repetitious. The preferred method employs four (or more if more RAM is provided) tiles of similar characteristics for each type of texture. These four tiles are referred to herein as the four member tiles of the same texture pattern. The boundaries of these four member tiles are pre-filtered in such a way that any two tiles in any orientations (eight possible orientations) may be laid side by side without sharp transitions. The eight orientations of a tile are obtained from the texture modulation intensity pattern table by addressing the X and Y address ports as shown in FIG. 12, where $\overline{X}$ indicates X complemented. Thus, eight orientations of a tile are obtained using memory (RAM) for only one tile (the eight orientations being illustrated in FIG. 13). The four member tiles together with their eight orientations give 32 different tiles for one texture intensity pattern type. A super tile consisting of $2^m$ by $2^m$ tiles is then created by selecting each of its constituent tiles pseudorandomly (or manually) from the 32 different tiles to best match the real life material the texture is to represent. Once the constituent tiles of a super tile are chosen, their identities (5-bit codes with 2 bits for member and 3 bits for orientation) are stored in a super tile RAM. This super tile is then replicated over the entire two-dimensional (2-D) space. This implies that the same texture intensity pattern is repeated every $2^m$ by $2^n$ by $2^m$ by $2^n$ square units. Tests with m=5, n=4 and Unit=1 ft indicates that this repetition rate is normally acceptable.

The memory hierarchy used to cover the entire two-dimensional (2-D) space is shown in FIG. 14. The high order m bits of the X and Y coordinates are used to look up the super tile random access memory (RAM) to obtain the 5-bit member/orientation code. This selects one of the 32 different tiles. The low order n bits of X and Y coordinates are then used to look up the texture modulation intensity from the selected member with the chosen orientation.

The above describes the creation of one particular type of two-dimensional (2-D) texture intensity pattern. Different types of two-dimensional (2-D) patterns are created in a similar fashion. A texture code attached to each surface (planar or quadric) allows different surfaces to receive the appropriate type of texture pattern.

Although two-dimensional (2-D) texture intensity patterns are necessary to represent natural texture, one-dimensional (1-D) texture intensity patterns are more appropriate for certain man-made texture (e.g., plowed fields, furrow). They are simulated, without additional random access memory (RAM), by holding the X coordinate (for horizontal one-dimensional (1-D) patterns), or the Y coordinate (for vertical 1-D intensity patterns)

constant when looking up the two-dimensional (2-D) texture intensity patterns. The constant determines the particular row or column of the two-dimensional (2-D) texture intensity pattern used in the generation of the one-dimensional (1-D) pattern.

In a typical mission, many different types of texture intensity patterns are required, requiring a very large memory. For example, to store 36 different types of texture intensity patterns, the memory size required is 36*S, where S is the memory size required for one type of texture intensity pattern. To avoid the need for such a large memory, six types of texture intensity patterns are chosen requiring a memory size of 6*S. From the six different types of patterns, $6C_2 = 15$ other different patterns are obtained by taking the sum (followed by a right shift) of any two of the six different types of patterns. Another 15 different types of patterns are obtained by taking the difference (followed by a right shift) of any two of these six different types of texture patterns. In this manner, 36 different types of texture intensity patterns are obtained while using only a memory size of 6*S. Even more different types of texture intensity patterns may be obtained by adding (or substracting) fractions ($\frac{1}{2}$, $\frac{1}{4}$, $\frac{1}{8}$, etc.) of any two pattern types if more hardware is available.

As previously indicated, to avoid aliasing, texture modulation intensities having varying degrees of filtering are stored. During a mission, the appropriate level of texture detail is retrieved according to the sampling period. As a result, there is a sudden transition from one level of detail to the next level of detail on the boundaries between two adjacent levels of detail. An example of this effect is shown in FIG. 15. To eliminate this undesirable effect, a method of mixing adjacent levels of texture detail is employed as indicated hereafter. As previously indicated, only the exponent of L (i.e., the integral part of $\log_2 L$) is used to choose the appropriate level of detail. To mix the texture intensities from two adjacent levels of detail, the fractional part of $\log_2 L$ is used as a ratio for mixing as depicted in FIG. 17.

Tests indicate that 4 bits representing the fractional part of $\log_2 L$ are normally sufficient for a smooth transition between levels of detail of the texture intensity pattern. Preferably, this mixing method is implemented by table lookup. When this method is applied to the textured scene in FIG. 15, a textured scene with smooth level of detail transition results, as shown in FIG. 16.

Preferably, since two adjacent levels of detail have to be accessed simultaneously to achieve mixing, adjacent levels of detail of texture pattern are arranged in such a way that they reside on different random access memory (RAM) banks for simultaneous access.

On a textured surface of large extent (e.g., the ground plane) the texture intensity pattern is reduced to a constant intensity (the average intensity of the pattern, corresponding to the lowest level of detail of the texture intensity pattern) at the far side of the surface. This is because, on the far side, the sampling period L is large compared with the physical unit of the basic texture element. In order to put texture on the far side, two types of texture intensity patterns of different resolution (i.e., different physical units for the basic texture element) are, preferably, superimposed. The texture intensity pattern with a larger physical size for the basic texture element is referred to herein as the far texture, while the one with smaller physical size for the basic texture element is referred to as the close texture. While the superimposed far texture does provide texture on the far side, it also causes a checkerboard type of far texture to be superimposed on the close side. This is because the physical size of a texture element of far texture is large on the close side and, hence, subtends a sizable area on the screen, giving rise to the undesirable checkerboard effect. This effect is depicted in FIG. 18.

As mentioned earlier, the checkerboard effect arises when texture elements of texture tiles occupy sizable areas on the screen, thus, painting the areas with constant texture modulation intensities. In order to eliminate the checkerboard effect, a method of interpolating texture modulation intensities is employed so that the intensities are continuous within a texture element, within a tile, and also across tile boundaries. This is accomplished as follows.

Texture intensity interpolation concept is illustrated in FIG. 20. In FIG. 20, a supertile consisting of four tiles, each with sixteen texture elements, is shown (in the implementation, a supertile actually consists of 32 by 32 tiles each with 256 texture elements). The four tiles in the figure are labeled T1 through T4. Texture element (0,0) in T1 is labeled T1(0,0), and intensity at the lower left corner of texture element T1(0,0) is labeled I1(0,0). The sixteen texture intensities of each tile are therefore assigned to the lower left corners of each square texture element in the tile. Intensities at the bottom of the supertile wraps around to the top of the supertile. Similarly, intensities at the left of the supertile wraps around to the right of the supertile. Since the supertile is repeated over the whole mapping space, texture intensity continuity is guaranteed within a tile, across tile boundaires, and across supertile boundaries.

The square texture element area is divided into two triangles, the upper triangle and the lower triangle. Texture modulation intensity within each triangle is then linearly interpolated from the intensities at the three vertices of the triangle.

FIG. 21 illustrates the interpolation of intensity on a particular square texture element area with intensities at the four corners designated at I0, I1, I2, and I3. Notice that on each triangular area of a square texture element three intensities (possibly from three different adjacent tiles such as texture element T1(3,3) in FIG. 6) have to be looked up from the texture look up table to perform linear interpolation. Detection of upper and lower triangle is accomplished by comparing the fractional part of the X and Y coordinates of the inverse transformation (referred to as XF and YF respectively in FIG. 7) as follows:

Upper Triangle: YF>XF

Lower Triangle: YF<XF

The intensity interpolation within the upper and lower triangles are accomplished as follows:

Lower Triangle:

Interpolated
Intensity$= I0 + XF^*(I1 - I0) = YF^*(I2 - I1)$

Upper Triangle:

Interpolated
Intensity$= I0 + YF^*(I3 - I0) + XF^*(I2 - I3).$

It should be noted that since XF and YF are fractions, (XF−1) and (YF−1) are the 2's complement of XF and YF, respectively.

Tests indicate that 5 bits representing XF and 5 bits representing YF are normally adequate. When this technique is applied to the textured scene shown in FIG. 18, a textured scene free of checkerboard effect results, as depicted in FIG. 19.

Illustrated in FIG. 11 of the drawing generally designated by the number 100 is the preferred embodiment in accordance with the present invention of a texture generating apparatus suitable for use with a system for digital image generation such as, for example, the modular digital image generator (DIG) illustrated at 102. Apparatus 100 is shown to employ as principal components three matrix element accumulators, designated 112, 114 and 116, a Z inverter 118, a pair of multipliers 120 and 122, a combined floating point to fixed point converter and adder 124, a level selector 126, a pair of texture table address generators 128 and 130, a near textured table 132, a combined far texture table and interpolator 134, a pair of blenders 136 and 138 and an adder 140.

Each of matrix element accumulators 112, 114 and 116, as part of the above mentioned X, Y or Z earth coordinate transformation, calculates the value of the expression $U_{1i} \cdot X_s + U_{2i} \cdot Y_s \cdot U_{3i}$ for i equals 1, 2 or 3, respectively, for each pixel (picture element) (NPE) for each scan line (NSL) of each field of the successive images generated by digital image generator 104. The respective accumulated matrix element value is converted to an absolute value after which it is converted into a floating point value for driving multipliers 120 and 122. Preferably, for this purpose, each of matrix element accumulators 112, 114 and 116 includes a combined interface and control unit driven by digital image generator 102, the unit having a counter and a programmable read only memory (PROM) driven by the counter to form a simple microprogrammed state machine. Also included is a (29-bit) multiplexer controlled by the combined interface and control unit and driven, in part, by a (29-bit) value developed thereby, the multiplexer having eight (quad 2-input) multiplexing devices of the type which are commonly designated 10158 of the 10,000 ECL series; a (16 by 29-bit) register file driven by the multiplexer (29-bits) and addressed (4-bits) and controlled (4-bits) by the combined interface and control unit, the register file having two macrocell array type devices also of the 10,000 series; an (29-bit) accumulator driven by itself and the register file (both 29-bit) and controlled by the combined interface and control unit, the accumulator having two macrocell array type devices also of the 10,000 series; and a (16-bit-to-4-bit) priority encoder driven by (the 16 most significant bits developed by) the accumulator, the encoder having four 10113 type exclusive OR devices, two 10165 type priority encoding devices and one 10158 type (quad) (2-input) multiplexing device. Finally, each matrix element accumulator includes a shifter driven by both the accumulator (29-bits) and the priority encoder (4-bits) and driving (17-bits) multipliers 120 and 122, the shifter having two 10108 type (16-bit programmable) shifting devices, and an exponent adjusting PROM driven by the priority encoder (4-bits) and driving the multipliers (6-bits), the PROM having one 10139 type (32 by 8) PROM device. The multiplexer is, additionally, driven by the (29-bit) value developed by the accumulator.

The combined interface and control unit obtains (29-bits representing) the pertinent matrix element values from digital image generator 102 and stores the values in the register file during each of the field flyback periods. During the active part of each scan line, the counter driven PROM addresses the register file and controls the multiplexer and the accumulator to evaluate the above expression.

After the absolute value of the expression is obtained, the priority encoder examines the most significant (16) bits of the expression value to ascertain the number of leading zeros. Based thereon, the shifter performs the shift operation to develop 16 mantissa bits which are also employed by the exponent adjusting PROM to generate (6) exponent bits to convert the expression value to floating point format.

An alternative embodiment of the present invention employs only two matrix element accumulators each for calculating a selected one of the three expressions.

Z inverter 118 calculates, as part of the earth coordinate transformation, the value of the inverse of $Z_s$ generated by digital image generator 102. Preferably, the Z inverse is calculated by means of a linear approximation according to the formula:

$$\frac{1}{Z} = \left(\frac{1}{Z_2} - \frac{1}{Z_2}\right) \cdot \left(\frac{Z - Z_1}{Z_2 - Z_1}\right) + \frac{1}{Z_1},$$

where $Z_1$ represents the more significant bits of Z and $Z_2$ represents the same bits with one added to the least significant one of the bits. For this purpose, Z inverter 118 includes a reciprocal table stored in one (256 by 18) PROM, a difference table stored in one (256 by 12) PROM, a (12-bit by 7-bit) multiplier having a pair of 10901 type (8-bit) array multiplying devices, an (18-bit) accumulator having one macrocell array type device and one 10287 type (2-bit) multiplying device, and an (6-bit by 6-bit) inverse exponent PROM table having one 10139 type (32 by 8) PROM device and one 10416 type device.

Multipliers 120 and 122 each develop a value representing the product of the inverse of $Z_s$, calulated by Z inverter 118, and the value of the expression calculated by a selected one of matrix element accumulators 112, 114 and 116. Preferably, each of multipliers 120 and 122 include circuitry having six 10901 type array multiplying devices for multiplying the (19-bit and 22-bit) mantissas and circuitry having three 10287 type multiplying devices for adding the two (6-bit) exponents.

Combined floating point to fixed point converter and adder 124 converts from floating point format to fixed point format the respective value developed by each of multipliers 120 and 122 and adds thereto the appropriate one of the pilot's eye position coordinates $X_o$, $Y_o$ or $Z_o$, generated by digital image generator 102, to develop earth coordinate values defined by the appropriate two of the three equations:

$$X_e = X_o + \frac{U_{11} X_s + U_{21} Y_s + U_{31}}{Z_s},$$

$$Y_e = Y_o + \frac{U_{12} X_s + U_{22} Y_s + U_{32}}{Z_s} \text{ and}$$

$$Z_e = Z_o + \frac{U_{13} X_s + U_{23} Y_s + U_{33}}{Z_s}.$$

Preferably, combined floating point to fixed point converter and adder 124 includes a pair of shifters each having three 10808 type (16-bit) programmable shifting devices to convert from floating point to fixed point format the (17-bit) value developed by a respective one of multipliers 120 and 122; a pair of multiplexers each having ten 10174 type (4-to-1) multiplexing devices for selecting a respective one of the three pilot's eye position coordinates $X_o$, $Y_o$ or $Z_o$; and a pair of adders each having one macrocell array type device and two 10287 type (2-bit) multiplexing devices for combining the selected (19-bit) pilot's eye position coordinate with the respective, fixed point, (17-bit) multiplier value.

Level selector 126 determines the texture element sizes for use with each of the pixels making up faces which are to receive texture. As previously indicated, for each pixel of the display, a level number is determined by taking the base 2 logarithm of the measure of the distance between adjacent pixels in either the X or Y direction ($Log_2 L_1$). The characteristic (integer) portion of the logarithm is used to create addresses to access the proper sized textured elements from the texture tables. The mantissa portion of the logarithm is used as the fractional level number to determine the amount of adjacent level blending to be performed.

The measure of distance is obtained by comparing the quantities:

$$\text{Log } \{Z^2 \text{ } R \text{ } DZIMAX \cdot \sqrt{2}\} \text{ and}$$

$$\text{Log } \{Z \sqrt{2} \text{ } (A,C)\},$$

and choosing the larger. Z, the reciprocal of $Z_s$, is the (Z direction) component of the pixel in channel coordinates.

Preferably, level selector 126 includes two random access memories (RAMs) each having six 10474 type RAM devices, six adders each having two macrocell array type devices, three PROMs each having five 10416 type (4024 by 4) PROM devices, three multiplexers each having two 10158 type (quad 2-input) multiplexing devices, a comparator having two 10166 type (5-bit) comparator devices, a detector and two gates. One of the PROMs stores a (256 by 8) table for converting the (8-bit) mantissa of the value of Z, generated by digital image generator 102, to the value of the log Z. One of the adders combines the (6-bit) exponent of the value of Z with the (6-bit) exponent of the initial value of Z. Another adder combines the value of the log Z with that of the log $\sqrt{2}$ MAX (A,C) to obtain (10-bits representing) the value of the log Z $\sqrt{2}$ MAX (A,C).

Another PROM stores a (256 by 8) table for converting the (8-bit) value of the mantissa of DZIMAX (the maximum incremental change in Z inverse), generated by digital generator 102, to the value of the log DZIMAX. Still another adder combines the (6-bit) exponent of DZIMAX with the (6-bit) initial value of DZIMAX. The RAMs store (1 k by 12) tables, one for converting the (10-bit) value of X, generated by digital image generator 102, to (12-bits representing) the value of $\{(AX_s+B)^2+1\} \sqrt{2}$ and the other for converting the (10-bit) value of Y, also generated by the digital image generator, to (12-bits representing) the value of $\{(CY_s+D)^2\} \sqrt{2}$. Still another adder combines these values to develop the value of $R^2$. The last PROM (storing a 256 by 4 table), the decoder and one of the multiplexers converts the value of $R^2$ to log R. The fifth adder combines twice the value of log $Z^2$ with the value of log DZIMAX to develop a value which is combined in the last adder with the value of log R to develop (10-bits representing) the value of log $Z^2$ R DZIMAX.

The comparator and last multiplexer selects the larger of the two values:

$$\text{Log } Z^2 \text{ } R \text{ } DZIMAX \cdot \sqrt{2} \text{ and}$$

$$\text{Log } Z \sqrt{2} \text{ MAX } (A,C)\theta;$$

and, the decoder and gates develops therefrom (7-bits representing) the near and (7-bits representing) the far level values.

Texture table address generators 128 and 130 each use the integer portion of the level values developed by level selector 126, the two earth coordinate values developed by combined floating point to fixed point converter and adder 124 and texture code values generated by digital image generator 102 to develop a pair of texture table addresses. The lower order bits of the pair of addresses are developed suitably inverted/or not and exchanged/or not to effectively reflect/or not and rotate/or not the accessed texture tiles as previously mentioned. The pair of addresses, which are referred to herein as a left table address and a right table address, are used one for addressing texture table level N and the other for level N+1.

Preferably, texture table address generators 128 and 130 each include two PROMs the first having nine 10416 type PROM devices and the other having two 10416 type PROM devices, two pair of multiplexers the first pair each having 13 10179 type (4-to-1) multiplexing devices and the second pair each having two 10158 type (quad 2-input) multiplexing devices, a RAM having two 10474 type (4024 by 4) RAM devices, a pair of gates each having two 10113 type (quad) exclusive OR gating devices, and a pair of shifters each having twenty 10164 type (8-line) multiplexing devices.

The first PROM stores a texture code converter table. Addressed by (from 4 to 8 bits) representing the texture code values generated by digital image generator 102, the first PROM retrieves a number of flags including a (1-bit) east/west flag, a (1-bit) north/south flag, a (1-bit) scale flag, a pair of (1-bit) texture identifying flags, a (1-bit) simple/composite flag and a (1-bit) level flag. Driven by a selected one of the (13-bit) X, Y and Z earth coordinate values, each of the first pair of multiplexers is controlled by the scale flag and a respective one of the east/west and north/south flags. Responsive to the east/west or north/south flag, the respective multiplexer is disabled to fix to zero (the bits representing) the respective coordinate value for one-dimensional (1-D) texture.

The RAM stores a tile and orientation selecting table. Addressed by the (5) most significant bits of the earth coordinate value coupled by each of the first pair of multiplexers, the RAM retrieves a pair of (1-bit) flags used to control the pair of gates, a (1-bit) flag used to control the second pair of multiplexers and a (2-bit) value used to address the second PROM. Depending upon the state of the flage, the gates invert/or not the (4) least significant bits of each of the earth coordinate values; and, the second pair of multiplexers interchange/or not (those bits of) the two values.

The second PROM stores a level table. Addressed by the above mentioned RAM developed value and the (3-bit) integer level value developed by level selector 126, the second PROM retrieves a pair of (3-bit) values for controlling the shifter. The pair of shifters each selects among the (5) most significant bits of both of the two earth coordinate values and the (4) bits developed by both of the latter pair of multiplexers and shifts the selected bits as dictated by the above mentioned (3-bit) flag retrieved by the RAM to develop a respective one of two texture table addresses.

Near texture table 132 is functionally divided into a left texture sub-table addressed by the left address developed by address generator 128 and a right texture sub-table addressed by the right address, also developed by address generator 128. Each of the sub-tables is functionally divided into six sub-sub tables each storing a respective one of the above mentioned texture types. All of the sub-sub tables are addressed simultaneously; and, all of the sub-sub tables simultaneously develop a value which represents the addressed texture pattern element. Preferably, near texture table 132 is configured around twenty 10474 type (4024 by 4) RAM devices.

In addition to the obvious differences in the texture intensity patterns stored therein, far texture table and interpolater 134 differs from near texture table 132 in that the former has circuitry for interpolating far texture intensity values for picture elements (pixels) within far texture elements. Interpolation eliminates the blocky checkerboard appearance that far texture elements would otherwise create when they extend over several pictures of the display. The interpolation is carried out for both level N and N+1 far texture elements.

Preferably, the interpolation is calculated according to the above mentioned equations:

lower triangle $$I_0 + XF \cdot (I1 + I0) + YF \cdot (I2 - I1)$$

and upper triangle $$I_0 + YF \cdot (I3 - I0) + XF \cdot (I2 - I3).$$

For this purpose, the interpolator includes circuitry which is functionally divided into left interpolation circuitry and right interpolation circuitry each including a comparator having one 10166 type (5-bit) comparator device, four RAMs each having eight 10474 type (4024 by 4) RAM devices, an inverter, a pair of multipliers each having two 10901 type (8 bit by 8 bit) array multiplying devices and a pair of adders each having one macrocell array type device. The comparator compares the (5) lower order bits of the two addresses developed by address generator 130 to develop a flag which indicates whether upper or lower triangle interpolation is in order. For lower triangle, $I_0$, $I_1$, and $I_2$ are read from memory; for upper triangle, $I_0$, $I_2$, $I_3$ are read from memory. The first adder combines the two (11) bit products developed by the multipliers; and, the second adder combines (adds or subtracts) the sum developed by the first adder with the respective far texture intensity value to develop a respective interpolated intensity value for driving blender 138.

In an alternative embodiment of the present invention, near texture table 132 has interpolation circuitry similar to that of far texture table and interpolator 134, the circuitry for near texture intensity interpolation.

Blender 136 selects and combines a pair of texture patern values developed by each of the sub-tables of near texture table 132 to develop a level N and a level N+1 texture table value. The two texture table values are combined in accordance with the fractional level number developed by level selector 126 to develop a near texture intensity value.

Preferably, blender 132 includes a left and a right pair of 8-to-1 multiplexers each configured around twenty 10164 type (8-line) multiplexing devices and a left and a right adder each configured around one 10180 type (dual) adder/subtractor device and two 10181 type (4-bit) arithmetic logic unit devices. Each multiplexer of the left and right pair of multiplexers selects one, or none, of the six texture type values developed by a respective one of the left and right sub-tables of near texture table 132. The left and the right adders each combines the two (5-bit) texture type values selected by the respective pair of left and right pair of 8-to-1 multiplexers to develop a respective (6-bit) left or right texture type value. Additionally, blender 132 includes a left and a right 4-to-1 multiplexer each having six 10174 type (dual 4-to-1) multiplexing devices and a N and a N+1 level PROM each having four 10416 type PROM devices. Responsive to the simple/composite flag and the level flag, both developed by the tile and orientation selecting table RAM of address generator 128, each of the 4-to-1 multiplexers selects between the left and right texture values developed by the left and right adders to develop a level N and a level N+1 texture value. The simple/composite flag is used to select a simple or composite pattern; and, the level flag is used to indicate whether the left or right channel is used to develop the level N, as opposed to the level N+1, texture value. Each of the two PROMs stores a blending level table, one for level N and the other for N+1. Addressed by the (3-bit) fractional level number and a respective one of the (5-bit) N and N+1 texture values, developed by the 4-to-1 multiplexers, the PROMs each retrieves a value which represents the texture value suitably scaled. The scaled N and N+1 values are combined in adder 140.

Blender 134 is, preferably, similar to blender 132.

Adder 140 combines the scaled N and N+1 values developed by blender 136 to develop a sum representing the near texture intensity value. Additionally, adder 140 combines two comparable values developed by blender 138 to develop a sum representing the far texture intensity value. Finally, adder 140 combines the near and far texture intensity values to develop a value representing the desired texture modulation intensity which the adder combines (adds) to the pixel (picture element) intensity value generated by digital image generator 102 to develop an intensity value for use by the digital image generator in painting the pixel. Preferably, for this purpose, adder 140 has one macrocell array type device.

Although the present invention has been described in terms of the present preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

It should be noted that, in certain ones of the claims, texture generating apparatus 100 is referred to as a surface detail generator. The combination of matrix element accumulators 112, 114 and 116, Z inverter 118, multipliers 120 and 122, and combined floating point to fixed point converter and adder 124, which may take the form of a pipeline calculator, is referred to as a perspective transformation computer; and, the combination of near texture table 132 and the far texture table portion of far texture table and interpolator 134 is referred to as a surface texture detail store.

We claim:

1. A method for generating texture for each pixel which is to receive texture of an image generated by a digital image generator, the method comprising in combination the steps of:

obtaining texture modulation intensities;

processing said texture modulation intensities to develop therefrom intensities suitable for storage;

storing said processed intensities as elements of a texture table;

thereafter, inverse transforming to earth coordinates two of the coordinates of the pixel;

processing said earth coordinates, to develop therefrom at least one texture table addresses;

accessing said texture table with said address to retrieve at least one addressed element; and processing said retrieved element to develop therefrom a texture intensity appropriate for said pixel for combination with the intrinsic intensity for said pixel generated by the digital image generator to develop an intensity suitable for use by said digital image generator in painting said pixel.

2. A method for generating texture as recited in claim 1 wherein said texture modulation intensities are obtained for a plurality of texture types, wherein said processed intensities are stored in accordnce with their type, wherein said texture table is accessed to retrieve at least two addressed elements each of different texture type, and wherein said retrieved element processing step includes the step of combining elements developed from said different texture type retrieved elements to develop an element from which said pixel appropriate texture intensity is developed.

3. A method for generating texture as recited in claim 1 wherein said processed intensities are stored as near and far elements, wherein said texture table is accessed to retrieve at least one addressed near element and at least the one addressed far element, and wherein said retrieved element processing step includes the step of combining an element developed from said far element and an element developed from said near element to develop said pixel appropriate texture intensity.

4. A method for generating texture as recited in claim 3 wherein said texture table is accessed to retrieve at least the three addressed far elements which correspond most nearly to said earth coordinates and wherein said retrieved element processing step includes the steps of interpolating between said three addressed far elements based on said earth coordinates and combining an element developed from said interpolated element and said element developed from said near element to develop said pixel appropriate texture intensity.

5. A method for generating texture as recited in claim 4 wherein said interpolating step is performed in accordance with the expression:

$$I_o + XF \cdot (I1 - I0) + YF \cdot (I2 - I1)$$

when said three addressed far elements form a lower triangle and is performed in accordance with the expression:

$$I0 + YF \cdot (I3 - I0) + XF \cdot (I2 - I3)$$

when said three addressed far elements form an upper triangle.

6. A method for generating texture as recited in claim 1 wherein said earth coordinate processing step includes the step of selecting among each of the bits of said earth coordinates and their inverse in a predetermined fashion to develop said address so as to reduce the apparent repetitiousness by which the texture is generated.

7. A method for generating texture as recited in claim 1 wherein said texture modulation intensity processing step includes the step of filtering said texture modulation intensities to develop said processed intensities so as to have a plurality of levels of detail, wherein said processed intensities are stored in accordance with their level of detail, wherein the method further comprises the step of calculating a level of detail appropriate for said pixel, wherein said texture table is additionally accessed with said detail level to retrieve at least one element from each of the two levels of detail which correspond most nearly to said detail level, and wherein said retrieved element processing step includes the step of interpolating between elements developed from said two detail levels to develop an element from which said pixel appropriate texture intensity is developed.

8. A methdod for generating texture as recited in claim 7 wherein said level of detail is calculated by taking the larger of the values represented by the two expressions:

$$\text{Log } Z^2 R \ DZ/\text{MAX} \cdot \sqrt{2} \text{ and}$$

$$\text{Log } Z \sqrt{2} \ \text{MAX } (A,C)\theta.$$

9. A method for generating texture as recited in claim 7 wherein said earth coordinate processing step includes the step of selecting among each of the bits of said earth coordinates and their inverse in a predetermined fashion to develop said address so as to reduce the apparent repetitiousness by which the texture is generated.

10. A method for generating texture a recited in claim 9 wherein said processed intensities are additionally stored as near and far elements, wherein said texture table is accessed to retrieve at least one addressed near element and at least the three addressed far elements which correspond most nearly to said earth coordinates, and wherein said retrieved element processing step includes the steps of interpolating between said three addressed far elements based on said earth coordinates and combining an element developed from said interpolated element and an element developed from said near element to develop said pixel appropriate texture intensity.

11. A method for generating texture as recited in claim 10 wherein said texture modulation intensities are obtained for a plurality of texture types, wherein said processed intensities are additionally stored in accordance with their type, wherein said texture table is accessed to retrieve at least two addressed elements each of different texture type, and wherein said retrieved element processing step includes the step of combining elements developed from said different texture type retrieved elements to develop an element from which said pixel appropriate texture intensity is developed.

12. A method for generating texture as recited in claim 1 wherein said pixel coordinates are transformed in accordance with said two of the three equations:

$$Xe = Xo + \frac{U_{11} Xs + U_{21} Ys + U_{31}}{Zs},$$

$$Ye = Yo + \frac{U_{12} Xs + U_{22} Ys + U_{32}}{Zs}, \text{ and}$$

$$Ze = Zo + \frac{U_{13} Xs + U_{23} Ys + U_{33}}{Zs}.$$

13. An apparatus for generating texture for each pixel which is to receive texture of an image generated by a digital image generator, the apparatus comprising in combination:
   means for inverse transforming to earth coordinates two of the coordinates of the pixel;
   means for developing at least one texture table address from said earth coordinates;
   a table storing as elements texture modulation intensities, said table being accessed by said address to retrieve at least one addressed element; and
   means for processing said retrieved element to develop therefrom a texture intensity appropriate for said pixel for combination with the intrinsic intensity for said pixel generated by the digital image generator to develop an intensity suitable for use by said digital image generator in painting said pixel.

14. An apparatus for generating texture as recited in claim 13 wherein said inverse transforming means includes at least two matrix element accumulator means each for calculating the value represented as a selected one of the three expressions:

$$U_{11} \cdot Xs + U_{21} \cdot Ys + U_{31},$$

$$U_{12} \cdot Xs + U_{22} \cdot Ys + U_{32}$$

and $$U_{13} \cdot Xs + U_{23} \cdot Ys + U_{33};$$

Z inverse means for calculating the value of the inverse of Zs; two multiplier means each for calculating the value of the product of the value developed by a respective one of said matrix element accumulator means and the value developed by said Z inverse means; and adder means for combining the respective one of the three values; Xo, Yo and Zo, with the value developed by each of said multiplier means to obtain a respective one of said earth coordinates.

15. An apparatus for generating texture as recited in claim 13 wherein said texture table adders developing means develops said address by selecting among each of the bits and their inverse of each of said earth coordinates in a predetermined fashion to develop said address so as to reduce the apparent repetitiousness by which the texture is generated.

16. An apparatus for generating texture as recited in claim 13 wherein said texture modulation intensities stored in said table are prefiltered and stored in accordance with their level of detail, wherein the apparatus additionally comprises a means for calculating a value representing a detail level appropriate for said pixel, wherein said table is accessed by said address and said detail level value to retrieve at least one addressed element from each of the two levels of detail which correspond most nearly to said detail level, and wherein said processing means includes blender means responsive to said detail level value and operative to interpolate between said retrieved elements to develop said appropriate texture intensity.

17. An apparatus for generating texture as recited in claim 16 wherein said detail level value is calculated by taking the larger of the values represented by the two expressions:

$$\text{Log } Z^2 R \, DZIMAX \cdot \sqrt{2} \text{ and}$$

$$\text{Log } Z \sqrt{2} \, MAX \, (A,C).$$

* * * * *